United States Patent
Delaplace et al.

(10) Patent No.: US 7,310,693 B2
(45) Date of Patent: Dec. 18, 2007

(54) METHOD AND APPARATUS FOR VIEWING ON A CLIENT COMPUTER'S DISPLAY DEVICE A PREVIEW OF A PRINT DOCUMENT TO BE PRINTED

(75) Inventors: Etienne X. C. Delaplace, Maisons Alfort (FR); Nadim Noureddine, Vincennes (FR); Olivier H. M. Roque, Frouzins (FR); Stéphane P. R. Appercel, Massy (FR); Pierre M. Meyer, Paris (FR)

(73) Assignee: OCÉ-Technologies B.V., Venlo (NL)

( * ) Notice: Subject to any disclaimer, the term of this patent is extended or adjusted under 35 U.S.C. 154(b) by 564 days.

(21) Appl. No.: 10/901,058

(22) Filed: Jul. 29, 2004

(65) Prior Publication Data

US 2005/0057766 A1 Mar. 17, 2005

(30) Foreign Application Priority Data

Aug. 1, 2003 (EP) ................................. 03291948

(51) Int. Cl.
*G06F 3/12* (2006.01)
*G06F 15/00* (2006.01)
*G06F 13/38* (2006.01)
*H04N 1/387* (2006.01)

(52) U.S. Cl. ................... 710/72; 710/8; 710/9; 710/10; 358/1.1; 358/1.2; 358/1.6; 358/1.9; 358/1.12; 358/1.15; 706/202; 706/203; 715/527

(58) Field of Classification Search .............. 710/8–10, 710/72; 358/1.15, 1.1, 1.2, 1.6, 1.12, 1.9; 709/202, 203; 715/527
See application file for complete search history.

(56) References Cited

U.S. PATENT DOCUMENTS

| | | | | |
|---|---|---|---|---|
| 5,675,717 A | * | 10/1997 | Yamamoto | .................. 358/1.9 |
| 6,078,936 A | * | 6/2000 | Martin et al. | ................ 715/527 |
| 6,351,317 B1 | | 2/2002 | Sasaki et al. | |
| 6,628,417 B1 | * | 9/2003 | Naito et al. | ................. 358/1.15 |
| 6,985,243 B1 | * | 1/2006 | Matsueda | .................. 358/1.15 |
| 2002/0046238 A1 | * | 4/2002 | Estavillo et al. | ............ 709/203 |
| 2003/0103221 A1 | | 6/2003 | Natori | |

FOREIGN PATENT DOCUMENTS

EP 1 132 808 A1 9/2001

* cited by examiner

*Primary Examiner*—Tammara Peyton
(74) *Attorney, Agent, or Firm*—Birch, Stewart, Kolasch & Birch, LLP

(57) ABSTRACT

A method and apparatus are provided for viewing on a client device document data representing at least a part of a document to be printed. The method includes transferring the document to be printed from a client device to a print server, converting at the print server the document to be printed into document data, and transferring the document data from the print server to the client device. The document data are at least part of a raster image file obtained by a raster conversion function, the raster conversion function being used to print the document.

18 Claims, 5 Drawing Sheets

METHOD AND APPARATUS FOR VIEWING ON A CLIENT COMPUTER'S DISPLAY DEVICE A PREVIEW OF A PRINT DOCUMENT TO BE PRINTED

The present application claims, under 35 U.S.C. § 119, the priority benefit of European Patent Application No. 03291948.2 filed Aug. 1, 2003, the entire contents of which are herein fully incorporated by reference.

BACKGROUND OF THE INVENTION

1. Field of the Invention

The invention relates to a method, apparatus and computer program for viewing on a client document data representing at least a part of a document to be printed.

2. Discussion of the Related Art

Most networks include a print server to which a print engine may be attached and a number of client computers sharing the resources of the print server so that the printer may be used by many users of the network. Documents to be printed may be sent from a client computer using a job submitter that transmits a print job from the client to the print server.

Documents to be printed usually contain text and graphics. Text describes letters and other symbols on a page, while graphics are for example a line, an illustration or a picture. Graphics may be transmitted to a print server as either an array of dots (bitmap graphics, also called raster graphics), or as a collection of lines (vector graphics). When an outline font is used, a letter is stored as a set of equations defining the lines which make the boundary of this letter.

The print server is provided with a controller having functions for the interpretation and rasterization. The interpretation function of the controller examines the data sent from the client computer and identifies the command embedded in the data, such as commands related to printer control, page format, font management, text layout and graphics. Rasterizing is the final stage in the process of preparing an image for printing, and converts the received commands into an array of dots to be used by the print engine. The print server is provided with a raster image processor (RIP) for performing the translation of a file containing vector format objects into a raster image file (also called bitmap file) to be sent to the print engine. Thus, the RIP produces the bitmap for each character of text, and places it at the specified position in the array and then overlays the array with any bitmap graphics, to form the pattern to be printed. Once the bitmap image file is ready, it is passed to the print engine.

A known method for viewing on a client computer the document data representing a document to be printed uses dedicated application software of the client. However this method requires proprietary client software and it has a number of drawbacks such as complexity and the fact that the view obtained on the client computer differs or deviates from the printed document. In particular, graphics and outline fonts are not rendered properly. Moreover the application software of the client has to be aware of all characteristics of all print engines accessible through the network. This requires very complex software that should be available on all client computers.

A method for viewing on a client computer the document data representing a document to be printed is known from European Patent Application Publication No. EP 1 132 808 A1. This publication describes how a print job is transmitted electronically to a reproduction center where it is converted into a format suitable for showing the final appearance of the printed document. The print job can be retransmitted in this format to the client for viewing purposes. The document obtained in this format, for example a PDF (Portable Document Format), is stored in a temporary document store of the reproduction center and then in a permanent document store of the reproduction center, and is then transmitted to the printer. This method, however, has the problem that the document converted for viewing purposes is print device independent and that only an approximate final appearance of the document to be printed can be obtained. Effects due to the print engine parameters (printer margins, paper size, positioning of image with respect to the paper, etc.) cannot be rendered properly. Moreover, outline fonts are not rendered accurately.

SUMMARY OF THE INVENTION

Accordingly, the present invention provides a method and apparatus in which these problems of the related art are mitigated.

It is accordingly an object of the present invention to provide an improved method and apparatus for viewing on a client (client device) document data representing at least a part of a document to be printed in which a true final appearance of the print document can be viewed on the client computer.

According to an aspect of the invention, this object and other objects can be achieved by a method for viewing on a client document data representing at least a part of a document to be printed in which the document data are at least part of a raster image file obtained by a raster conversion function, the raster conversion function being used to print the document. Since the raster conversion function of the print server is the same as that used to generate a raster image file for the selected print engine, the generated document data ensures to obtain a preview on the client showing a true and complete final appearance of the document. This is applicable especially to graphics and to outline fonts. Additionally, the application of the client computer is less complex than in the case that it has to interpret a PDF file, which makes it easy to develop for a large variety of environments.

In accordance with an embodiment of the method according to the invention, the raster conversion function at the print server performs the step of dividing the raster image file into areas. Thus even more efficient viewing processing at the client of the bitmap image generated by the print server is achieved.

In accordance with an embodiment of the invention, the step of converting the document to be printed into document data is followed by the step of compressing the raster image file obtained by the raster conversion function. Thus it is possible to obtain a more efficient and rapid transfer of the document data from the print server to the client.

In accordance with an embodiment of the method according to the invention, the flow of data is streamed during the steps of transferring the document to be printed from the client to a print server, converting at the server the document to be printed into document data and transferring the document data to the client. Thus this ensures optimal performance and the time needed for viewing the image on the client can be reduced.

According to an aspect of the invention, the client is provided with a client data buffer and the print server is provided with a server data buffer, whereby the size of the client data buffer and the size of the client data buffer are dynamically adjusted. Thus the waiting time for the client can be reduced significantly.

In an embodiment of the method according to the invention, the raster conversion function at the server generates a raster image file having a size optimized for the step of transferring the document data to the client. Thus the volume of data to be transferred can be limited which ensures a gain of time when viewing the document at the client.

According to an embodiment of the present invention, the raster conversion function at the server generates on demand by the client a second raster image file having a size optimized for zooming purposes at the client. Thus the client can request a second raster image file at a higher resolution, for the whole document to be printed or only for the area that is to be zoomed.

According to an aspect of the invention, the document data is stored in a memory unit of the printer server. Thus, raster image files obtained by the raster conversion function of the print server can be kept for some time in a memory, which avoids the step of converting again a document to be printed into document data when the same document is to be viewed.

In an embodiment of the method according to the invention, the document to be printed is stored in a memory unit of the printer server. This avoids having to send a document to be printed several times to the printer server, for example first for viewing purposes on the client, and then for printing.

The apparatus according to an aspect of the invention provides a controller including a raster conversion function generating for the document data a raster image file, the raster conversion function being used to print the document on at least print engine.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be explained with reference to the following exemplified embodiments of the present invention, and illustrated by reference to the drawings. The embodiments serve to illustrate the invention and should not be regarded as a limitation thereof.

DETAILED DESCRIPTION OF THE PREFERRED EMBODIMENTS

Figure 1:
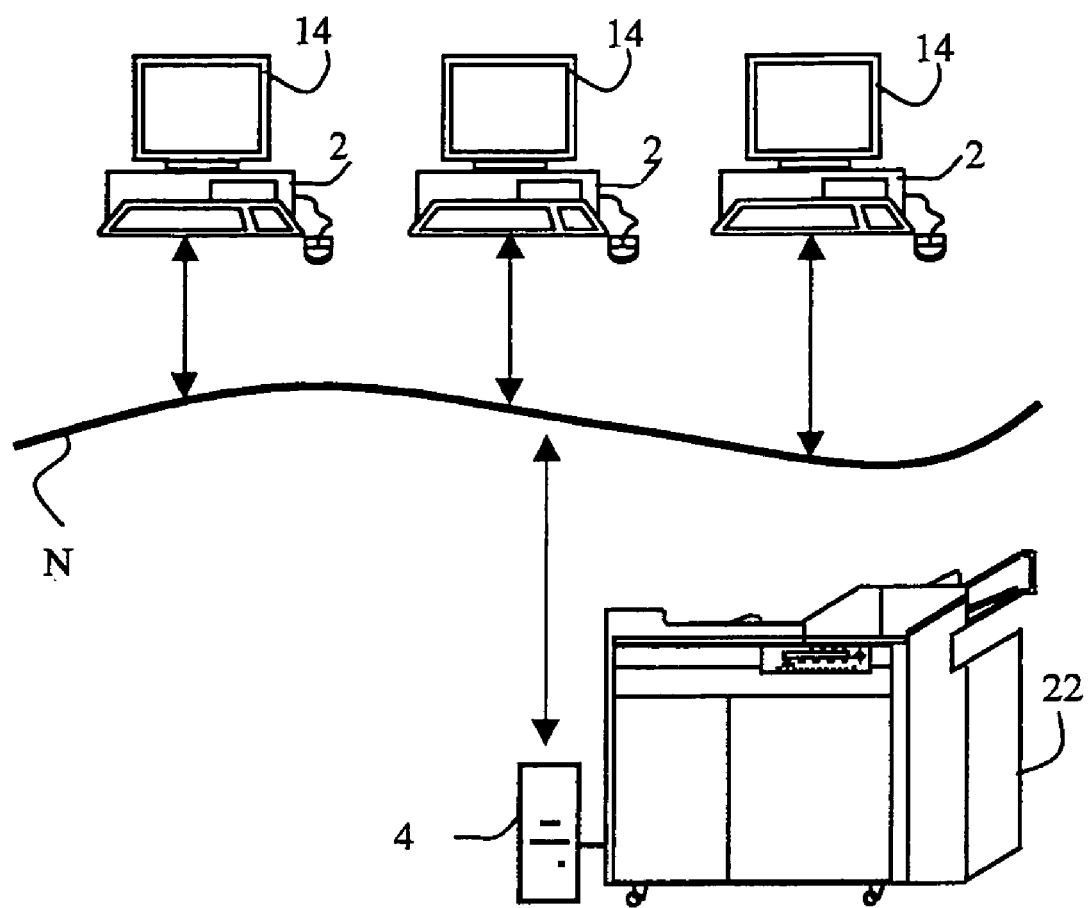
FIG. 1 is a schematic diagram of a print server connected to clients in a network environment, for use in connection with the invention.
Figure 3:
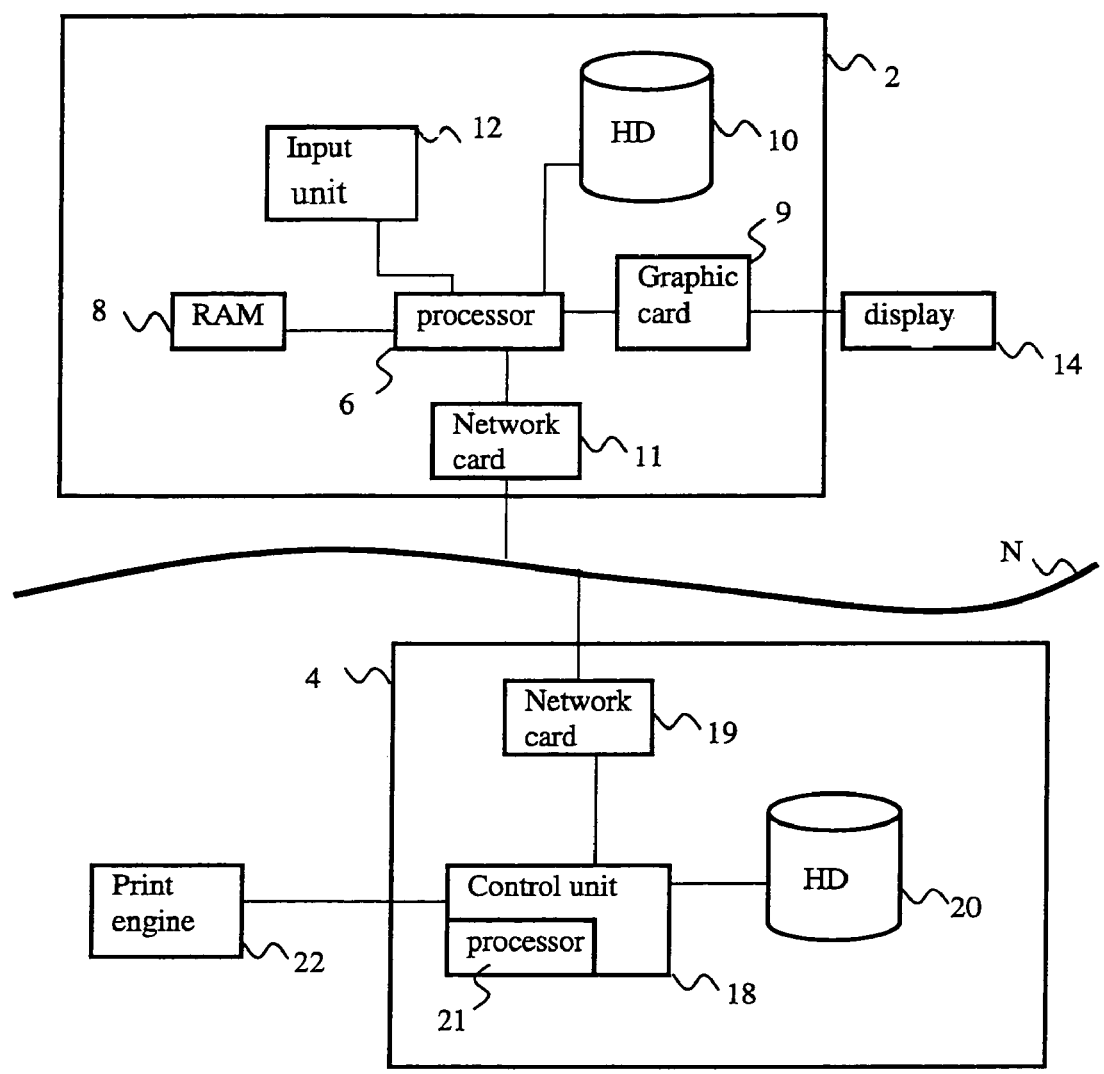
FIG. 3 is a simplified component diagram of an apparatus according to an embodiment of the invention.

FIGS. 1 and 3 show a system according to an embodiment of the present invention. The system includes one or more client computers 2, at least one print engine 22, and a print server 4 connected by a network N such as a local network. All the components of the system are operatively coupled. The print server 4 sends print jobs to the print engine 22 and the client computers 2 are connected through the network N to the print server 4. The client computers 2 are for example workstations, each having at least one processor 6 (shown in FIG. 3), a random access memory 8, a memory 10 such as a hard disk, a graphic card 9 and a network card 11. A display unit 14, such as a monitor, is connected to the client computer 2 for displaying purposes. The client computer 2 also comprises an input unit 12, for example a keyboard, a mouse or other indicator instruments. Users having a document to be printed from their workstation 2 connected to the network N can choose for that purpose from a number of print engines 22.

As shown in FIG. 3, the print server 4 includes a control unit 18, a memory 20 and a network connection unit 19 such as a network card, all operatively coupled. All or a part of the print server (4) components can be placed in the print engine 22.

Figure 2:
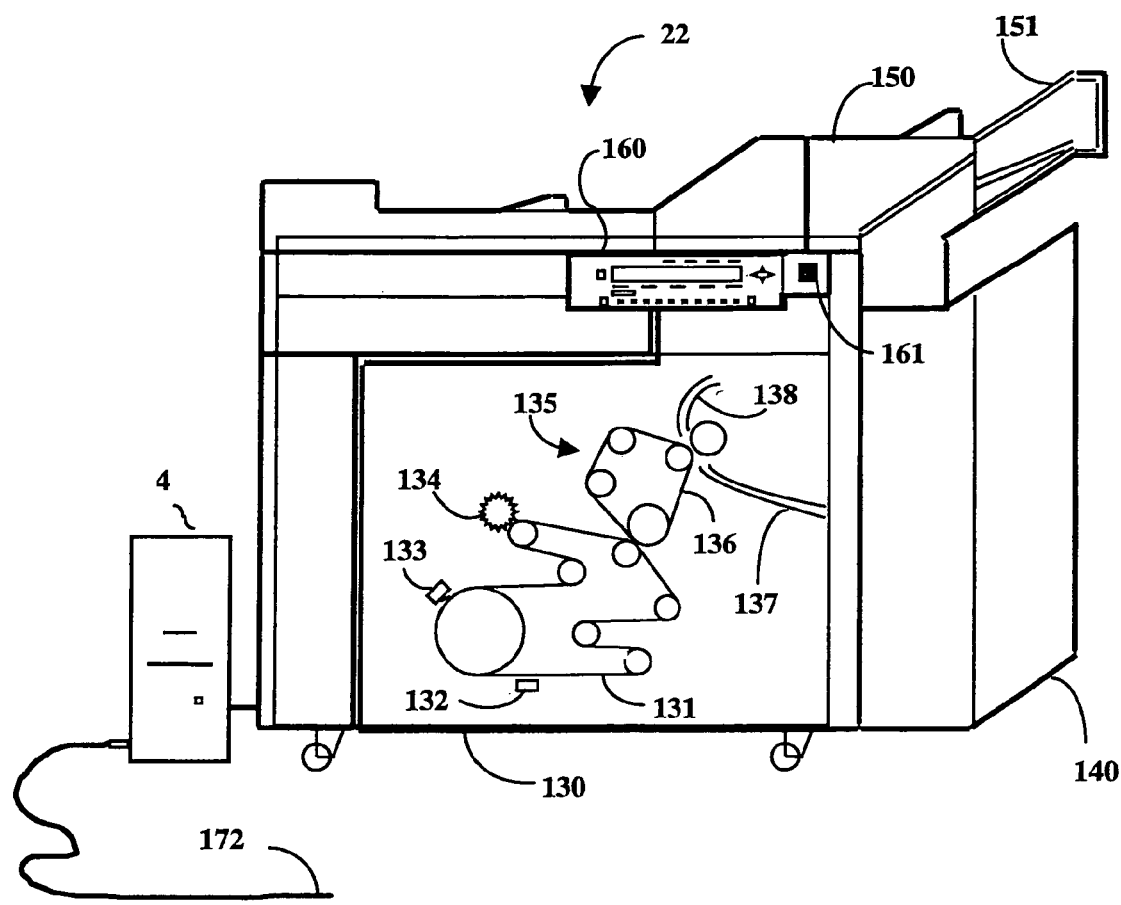
FIG. 2 is a schematic diagram of a print server for sending print jobs to a print engine for use in connection with the invention.

FIG. 2 shows the print server 4 for sending print jobs to an example of the print engine 22 of which various parts are illustrated diagrammatically according to an embodiment of the present invention. The print engine 22 can use any number of printing techniques, and can be a thermal inkjet printer, a pen plotter, or a press system based on organic photoconductor technology, for instance. Color printing is achieved for example using an inkjet printer provided with four different basic inks, such as cyan, magenta, yellow and black.

The parts of the print engine 22 comprise a printer unit 130 for making prints of images on image supports such as sheets of paper in accordance with digital image data, a supply unit 140, a finishing and outputting section 150 for image supports and a user interface unit 160. The control unit 18 and the network connection unit 19 of the print server 4 shown in FIG. 3, are connected to different parts of the print engine 22.

The printer unit 130 comprises an electro-photographic processing stage known, in which a photo-conductive medium 131 in the form of a belt is charged by means of a corona unit 132 and then exposed by means of an LED array 133 in accordance with digital image data. The charge image thereby formed on the medium 131 is developed with toner powder in a developing unit 134, after which the toner image is transferred, in a combined transfer and fixing unit 135, to a heated rubber belt 136. The toner powder softens on this belt 136 as a result of the heat of the belt 136 and becomes tacky. It is then transferred and fixed on an image support, e.g., a sheet of paper, fed from a supply stage via a conveyor 137.

A supply of image supports, for example sheets of paper in different sizes and orientations, is available in the supply unit 140.

The image supports with the toner image are transported via a conveyor 138 to the finishing and outputting section 150, which if necessary collates them into sets, staples them and then deposits them in a delivery tray 151 of the section 150.

The user interface panel of the unit 160 is provided with a display screen and keys. The unit 160 is connected to the control unit 18 and the network connection unit 19 of the print server 4. The unit 160 also includes a contact lock 161 for switching on and off the print engine 22 and other input units such as buttons for selecting a user, setting queuing parameters, etc.

The control unit 18 of the print server 4 being connected to the print engine 22 comprises a microprocessor 21 (shown in FIG. 3), the memory 20 such as a hard disk, and suitable hardware circuits, and further comprises modules for controlling the units/sections 130, 140, 150 and 160. The control unit 18 also comprises an image processing module for processing the digital image data so that prints of good image quality can be made by the printer unit 130.

The print server 4 connected to the print engine 22 also comprises the network connection unit 19 for connection to the network N, which is diagrammatically shown in the form of a cable 172 in FIG. 2. The network connection unit 19 receives print jobs from the client computers 2 (the workstations), converts them into format that can be processed by the print unit 130 and ensures in co-operation with the control unit 18 that the digital images are printed on image supports.

A method for viewing on a client document data representing at least a part of a document to be printed is now explained with reference to FIG. 4, which depicts a flow diagram showing the method according to an embodiment of the invention. The method(s) of the present invention can be implemented in the system of FIGS. 1-3 or other suitable systems. Reference number 200 indicates processes occurring at the computer client side such as at the client computer 2, while reference number 400 indicates processes occurring at the print server side such as at the server 4.

The invention can be used for viewing any type of document to be printed, and is particularly useful for viewing wide format originals colour images with randomly distributed areas containing small details. Engineering drawings are a typical example of such originals. The documents to be printed can have formats such as HP-GL/2, Calcomp, PostScript/PDF, etc. The method according to the embodiments of the invention is particularly useful when vector-based graphics are to be viewed on the client computer before printing them. The invention is particularly useful to obtain a view of vector-based graphic object such as a line, since critical visual aspects such as line thickness and colors can be checked before actually printing. The invention is also very useful in order to obtain a view of outline fonts.

The method according to an embodiment of the invention as applied to the system of FIGS. 1-3, as an example, will now be described referring to FIG. 4.

When a user wants to view on his monitor a document to be printed, such as an engineering drawing having the format HP-GL/2, he calls up a client application, for example by clicking an icon intended for the purpose in the application window of his monitor associated with the user computer 2. The file corresponding to the document to be printed is read on the client side (step S2 in FIG. 4). The user may choose to make use of a viewing function before he decides whether the document is to be printed. The document to be viewed and/or to be printed is thus transferred (step S4) through the network N to the print server 4 connected to a print engine 22 selected by the user. For sending the file, an http network communication (S6) may be used.

Figure 4:
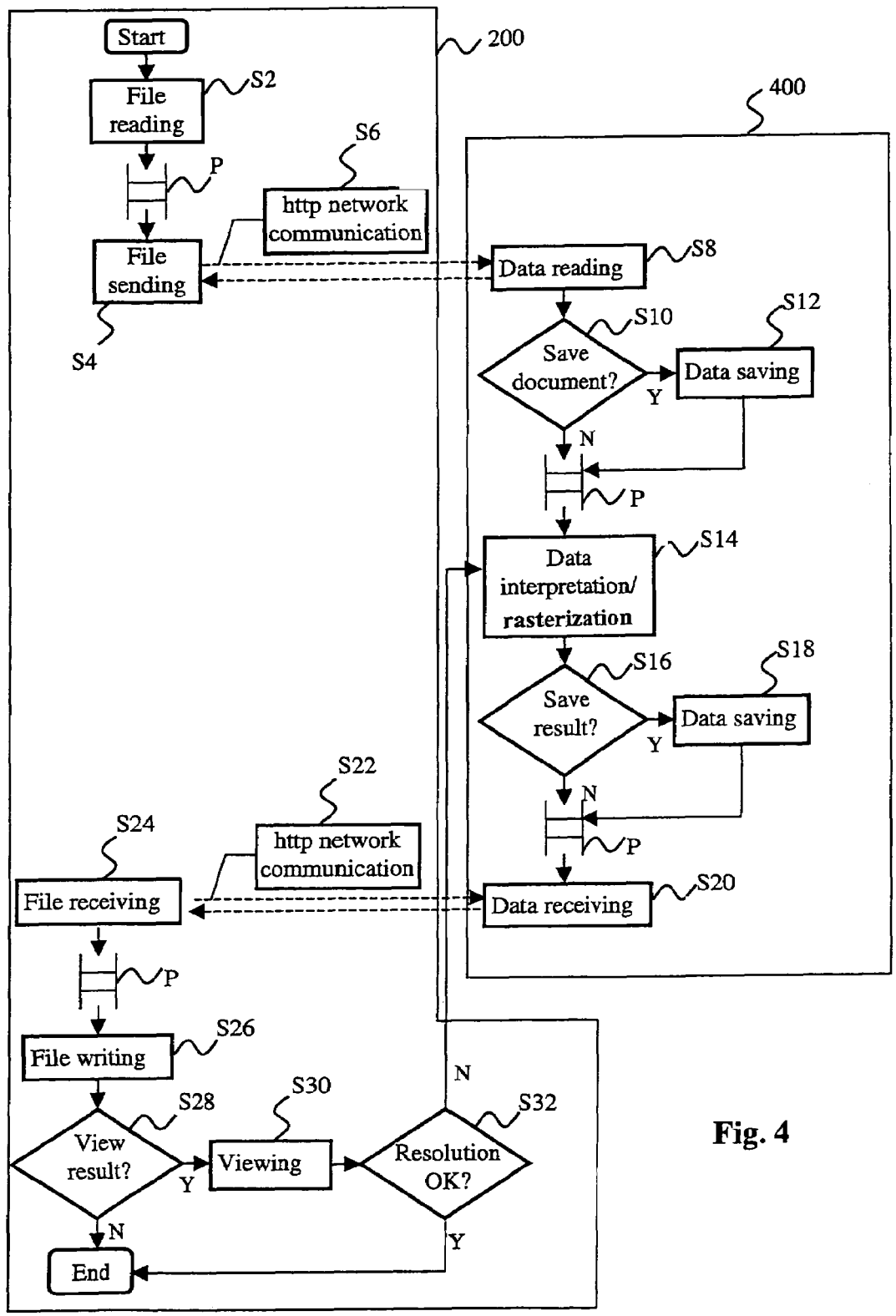
FIG. 4 is a flow diagram showing a method according to an embodiment of the invention.

At the print server side 400, a process is dedicated to receive the data from the client computer 2 as shown by step S8 in FIG. 4. The received print job can be scheduled by the control unit 18. For example, it can be placed in a queue. Optionally (S10), the data corresponding to the document to be printed may be saved (S12) in a memory such as the hard disk 20 at the print server 4, which avoids sending the data again when the same document is to be printed or viewed. A process at the print server (4) side is dedicated to transmit the document to be printed to the interpreter. Next, a raster conversion function (S14) performed by the processor 21 of the print server 4 such as a Raster Image Processor (RIP) of the control unit 18, interprets the document to be viewed and/or to be printed. Thus a raster image file is obtained by the raster conversion function, which raster conversion function is the same as that used for generating a raster image file being used for printing the document. Optionally (S16), the result of the interpretation may be saved (S18) in the memory 20 such as the hard disk on the print server 4.

A process (S20) is dedicated to read the document data output by the raster conversion function. The document data is at least part of a raster image file such as a file in a TIFF format. According to an embodiment, it is preferred that the raster conversion function at the print server 4 performs the step of dividing the raster image file into areas. Areas can be any part of an image, it could be a tile or a band of an image, of any convenient area of an image. According to the invention, the same raster conversion function is used when the user decides to print the document.

Next the document data is sent from the print server 4 to the client computer 2, using for example an http network communication (S22). The document data is received at by the client computer 2 (S24) and written (S26) in a file that is stored in the memory 10, for example. The user can decide whether he wants to obtain a view of the document to be printed (S28). If so, a viewing application at the client computer side is started (S30) to read the document data, which is for example a TIFF document and to display it on a display (e.g., the monitor 14). The resolution of the document data generated for viewing purposes is for example 100 dots per inch (dpi). A relatively low resolution such as 100 dpi is well suited for a rapid transfer of the document data (a TIFF raster image file, for example) from the print server to the client computer. A view resolution of 100 dpi is thus an example of a trade-off between the quality of the view obtained on the display screen and the speed of transfer. However, it can happen that the user needs a higher resolution for zooming certain areas of the document. The user is asked if the resolution of the current view is satisfying (S32). If not, another raster image file is generated (S14) by the rasterization function at the print server side, with a resolution well suited for zooming purposes and the raster image file is transferred to the client computer, repeating the above described process (step S14 and subsequent steps).

References P in FIG. 4 indicate that processes are connected to each other through data buffers. Data buffers are memory streams in which one process can write data while another process can read data. Each data buffer has a limited amount of memory available. When a data buffer is full, the writing operation is put on hold. When a buffer is empty, the read operation is put on hold.

For a better efficiency, files can be sent block by block. In order to transfer each block, an http request is flushed, because this protocol needs to give the request size within its header. This property does not allow sending large files in a single http request because of memory consumption issues. Hence, it is preferred to send files block by block. For example, during the period that a block is sent (S4, S6) through the network from the client computer to the print server, another process taking place is reading (S2) of a next block. When a result block is received, it is transmitted to another process to write it in the result file, in order to request as fast as possible the next result block before the current block writing is done (S22, S24, S26).

Figure 5:
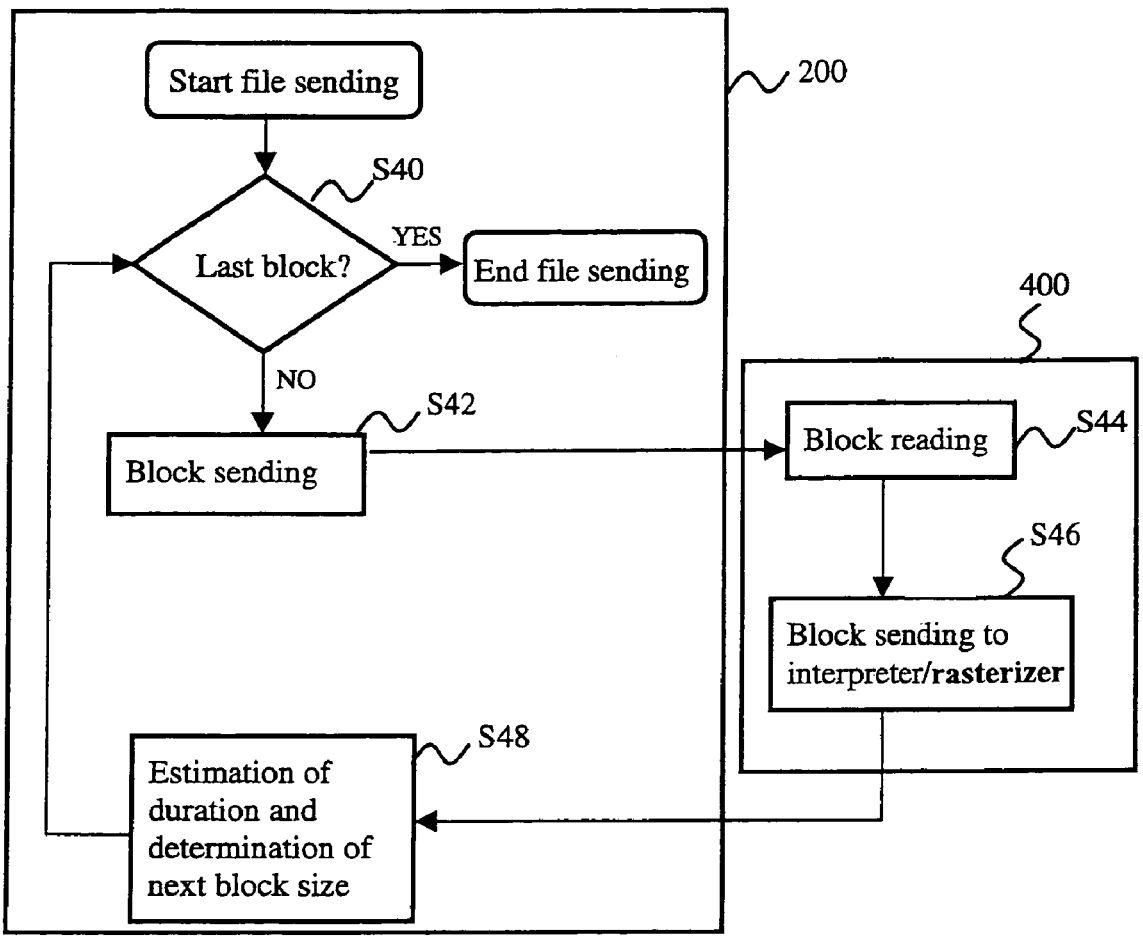
FIG. 5 is a flow diagram showing a transfer process according to an embodiment of the invention.

FIG. 5 shows a diagram explaining how a file is sent (S4, S6, S8) from the client computer (200) to the print server (400) according to an embodiment of the present invention. With the required modifications, it could also apply to the steps S20, S22, S24. Thus the overall interpretation/rasterization time can be optimized.

Referring to FIG. 5, a Boolean operation (S40) determines whether the treated block is the last one of the file. If so, the process of file sending is over. If not, the block is sent (S42) to the print server where it is read (S44). Then the block is sent to the interpreter/rasterizer (S46). A process (S48) of the client computer estimates the overall duration between the moment that file sending has started and the moment that the raster image file is available on the client computer. The estimation is done by extrapolating the time the current block took to be sent to the interpreter/rasterizer to the total file size. By comparison with the previous result(s), the client computer 2 can determine whether the data block size should be increased or decreased. This is done in order to increase the time efficiency of the process.

In order to obtain even faster processes and fast transfer of data, the raster image file obtained by the RIP for viewing purposes can be compressed. A well suited format is for example compressed TIFF.

The processing steps of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for viewing on a client device document data representing at least a part of a document to be printed, the method comprising:
    transferring the document to be printed from a client device to a print server;
    converting at the print server the document to be printed into document data;
    transferring the document data from the print server to the client device;
    determining time information associated with the transferring steps; and
    adjusting a data block size for transferring the document to the print server, based on the determination result and a total size of the document to be printed,
    wherein the document data are at least part of a raster image file obtained by a raster conversion function, the raster conversion function being used to print the document.

2. The method according to claim 1, wherein the raster conversion function is at the print server and performs a step of dividing the raster image file into areas.

3. The method according to claim 1, wherein the step of converting the document to be printed into document data is followed by a step of compressing the raster image file obtained by the raster conversion function.

4. The method according to claim 1, wherein a flow of data is streamed during the transferring steps and the converting step.

5. The method according to claim 1, wherein the client device is provided with a client data buffer and the print server is provided with a server data buffer, and the size of the server data buffer and the size of the client data buffer are dynamically adjustable.

6. The method according to claim 1, wherein the raster conversion function is at the print server and generates a raster image file having a size optimized for the step of transferring the document data to the client device.

7. The method according to claim 1, wherein the raster conversion function is at the print server and generates on demand by the client device a second raster image file having a size optimized for zooming purposes.

8. The method according to claim 1, wherein the document data is stored in a memory unit of the print server.

9. The method according to claim 1, wherein the document to be printed is stored in a memory unit of the print server.

10. The method according to claim 1, wherein the transferring steps are performed through a network.

11. A system for viewing document data representing at least a part of a document to be printed, comprising:
    a print server to send print jobs; and
    at least one client device connected through a network to the print server,
    wherein the client device is suited for transferring a document to be printed to the print server,
    the print server comprises a controller to convert the document to be printed into document data and the print server is suited for transferring the document data to the client device,
    the controller comprises a raster conversion function generating for the document data a raster image file, the raster conversion function being used to print the document by a print engine, and
    the client device determines time information associated with the transferring of the document to the print server and the transferring of the document data to the client device, and adjusts a data block size for transferring the document to the print server, based on the determination result and a total size of the document to be printed.

12. A system for viewing on a client device document data representing at least a part of a document to be printed, the system comprising:
    means for transferring the document to be printed from a client device to a print server;
    means for converting at the print server the document to be printed into document data;
    means for transferring the document data from the print server to the client device;
    means for determining time information associated with the transferring of the document by the means for transferring and the transferring of the document data by the means for transferring; and
    means for adjusting a data block size for transferring the document to the print server, based on the determination result and a total size of the document to be printed, wherein the document data are at least part of a raster image file obtained by a raster conversion function, the raster conversion function being used to print the document.

13. A computer program product residing on at least one computer-readable medium, for viewing on a client device document data representing at least a part of a document to be printed, the product comprising computer-executable instructions for:

transferring the document to be printed from a client device to a print server;

converting at the print server the document to be printed into document data;

transferring the document data from the print server to the client device;

determining time information associated with the transferring of the document to the print server and the transferring of the document data to the client device; and adjusting a data block size for transferring the document to the print server, based on the determination result and a total size of the document to be printed, wherein the document data are at least part of a raster image file obtained by a raster conversion function, the raster conversion function being used to print the document.

14. The computer program product according to claim 13, wherein the raster conversion function is at the print server and performs a step of dividing the raster image file into areas.

15. The computer program product according to claim 13, further comprising computer-executable instructions for:

compressing the raster image file obtained by the raster conversion function.

16. The computer program product according to claim 13, wherein the raster conversion function is at the print server and generates a raster image file having a size optimized for the step of transferring the document data to the client device.

17. The computer program product according to claim 13, wherein the raster conversion function is at the print server and generates on demand by the client device a second raster image file having a size optimized for zooming purposes.

18. The computer program product according to claim 13, further comprising computer-executable instructions for:

storing the document data in a memory unit of the print server; and storing the document to be printed in a memory unit of the print server.

* * * * *